United States Patent [19]

Weeks et al.

[11] 4,354,183
[45] Oct. 12, 1982

[54] LUBRICATION MONITORING SYSTEMS

[75] Inventors: Michael W. Weeks; Thomas C. Brandram, both of Plymouth, England

[73] Assignee: Interlube Systems Ltd., Great Britain

[21] Appl. No.: 18,831

[22] Filed: Mar. 8, 1979

[30] Foreign Application Priority Data

Mar. 13, 1978 [GB] United Kingdom ............ 09802/78

[51] Int. Cl.³ .................................................. G08B 19/00
[52] U.S. Cl. .................................. 340/682; 73/204;
340/57; 340/606; 340/622; 374/153
[58] Field of Search ................... 184/6.4; 137/552;
340/57, 606, 611, 622, 682, 522, 527, 679, 60;
73/204, 351

[56] References Cited

U.S. PATENT DOCUMENTS

| | | | |
|---|---|---|---|
| 2,940,070 | 6/1960 | Sanders | 340/611 X |
| 3,312,966 | 4/1967 | Schaller | 340/606 |
| 3,487,467 | 12/1969 | Gruber | 340/682 X |
| 3,548,396 | 12/1970 | Roberts | 340/682 X |
| 3,582,928 | 6/1971 | Gaertner | 340/682 X |
| 3,674,112 | 7/1972 | Roberts | 184/6.4 X |
| 3,782,501 | 1/1974 | Pagella | 340/682 X |
| 3,922,658 | 11/1975 | Harper et al. | 340/622 |
| 4,001,802 | 1/1977 | Fales | 340/622 X |
| 4,074,575 | 2/1978 | Bergman et al. | 340/682 X |
| 4,122,720 | 10/1978 | Podl | 340/57 X |
| 4,126,207 | 11/1978 | Dibowski et al. | 184/6.4 X |

Primary Examiner—John W. Caldwell, Sr.
Assistant Examiner—Joseph E. Nowicki
Attorney, Agent, or Firm—Kane, Dalsimer, Kane, Sullivan and Kurucz

[57] ABSTRACT

A bearing assembly includes a lubricated bearing and a thermistor mounted in or adjacent the lubricant flow path through to or from the bearing. The thermistor is in heat exchange relationship with the lubricant and is connected in an electrical circuit so as to operate in the self heating mode to respond to a deleterious change in the flow of lubricant along the path. The rate of flow of lubricant determines the rate of dispersion of heat from the thermistor and thereby determines the temperature of the thermistor.

19 Claims, 14 Drawing Figures

LUBRICATION MONITORING SYSTEMS

This invention relates to bearing assemblies and in particular to a bearing assembly including a lubricated bearing and an arrangement for monitoring the flow of lubricant through the bearing.

It is well known that the efficient and long lasting operation of bearings in a machine is dependent upon effective lubrication of the bearings. It is therefore important to be able to monitor the lubrication system on a machine and provide an early warning of any malfunctioning in the system. The lubrication system is, however, often relatively simple and cheap and it is therefore important that any monitoring system should also be cheap as well as being reliable. Hitherto it has proved at best difficult to provide such a lubrication monitoring system.

It has been proposed to monitor the temperature of a bearing with a temperature sensitive device, for example a thermistor. The thermistor is placed in or adjacent the bearing and in the event of a fault developing in the bearing itself or a fault developing in the lubrication system the temperature of the bearing rises thereby changing the resistance of the thermistor. This change in resistance of the thermistor is then used to trigger some kind of alarm device. Arrangements of this kind are not however very satisfactory since the temperature of the bearing will fluctuate quite considerably under normal working conditions, for example as a result of changes in ambient temperature so that a monitoring system of this kind is not reliable. Also the monitoring system responds only as the bearing temperature increases by which time some damage may already have been done to the bearing.

It has also been proposed in the past to use a pressure responsive transducer inserted, for example, in the lubricant inlet of a main bearing housing to monitor the pressure of the lubricant entering the bearing. Certain faults may, however, occur in the lubrication of the operational parts of the bearing which do not materially affect the pressure of lubricant entering the bearing and these faults go undetected by a pressure responsive transducer. Furthermore pressure responsive transducers are fairly delicate and expensive devices so that the cost of a monitoring system using such transducers is high.

It is an object of the invention to provide a bearing assembly which mitigates the disadvantages described above.

According to the invention there is provided a bearing assembly including a lubricated bearing and a thermistor mounted in or adjacent the lubricant flow path through, to or from the bearing, the thermistor being in heat exchange relationship with the lubricant, wherein the thermistor is connected in an electrical circuit in the self heating mode to respond to a deleterious change in the flow of lubricant along the path.

In use, the thermistor reacts to a change in the flow of lubricant (without any change in temperature of the lubricant); for example, if the lubricant path within the bearing becomes blocked the lubricant flow stops and the heat generated by the thermistor is dispersed less rapidly than when the lubricant was flowing. As a result, the temperature of the thermistor rises and its resistance changes. If a pressure transducer were used, the blockage would not be detected since the pressure of the lubricant upstream of the blockage would be maintained. Also, if a thermistor, being used merely as a temperature sensor, were used the blockage would not be detected until the bearing had overheated by which time some damage might already have been done to the bearing.

Although the primary purpose of the thermistor is to respond to changes in lubricant flow rate, it will also respond to overheating of the bearing without any change in the lubricant flow rate since overheating of the bearing will heat the lubricant thereby reducing the rate at which heat generated by the thermistor is dispersed so that the temperature of the thermistor rises.

The thermistor may be mounted in an assembly interposed in the lubricant flow path at or adjacent the bearing.

The assembly in which the thermistor is mounted may comprise a housing defining a chamber, first passage means extending from the chamber to a first port for connection to a lubricant supply and second passage means extending from the chamber to a second port connected to the lubricant flow path through the bearing, and a thermistor located in the chamber.

The first passage means may be so narrow that lubricant in the chamber is substantially thermally isolated from the lubricant upstream of the chamber. This increases the sensitivity of the thermistor to changes in the lubricant flow and reduces its response time.

The chamber may be small so as to minimize the quantity of lubricant heated by the thermistor at any one time.

The thermistor may be located between races of the bearing.

According to another aspect of the invention there is provided a machine having a lubricated part and a bearing assembly as defined above.

The term "machine" in this specification refers to any mechanism with one or more moving lubricated parts.

The machine may further include a lubrication system and a lubrication monitoring system for monitoring lubrication at a plurality of points in the machine, one of the points being said bearing assembly, the monitoring system including a plurality of thermistors for location at respective ones of said plurality of points in the machine to respond to a deleterious change in the lubricant flow at the monitored point by a change in the resistance of the thermistor at that point, and the system further including means responsive to a change in resistance of a thermistor to perform an indicating function or a control function or both.

The machine may further include multiplexing means for scanning each of the electrical outputs from the thermistors in turn, the responsive means being connected to an output of the multiplexing means to respond to a change in the electrical output of any of the thermistors.

The responsive means may include indicating means to perform an indicating function in response to a change in resistance of a thermistor. The indicating means may include a light emitting diode display.

A respective indicating means may be provided for each of the thermistors and each indicating means may comprise a light emitting diode.

A common indicating means may be provided to give a fault indication in the event of a deleterious change in the lubricant condition at any of the monitored points.

The common indicating means may be an audio alarm.

The responsive means may include control means for performing a control function in response to a change in resistance of a thermistor.

The machine may further include a transducer for detecting a lack of increase in the pressure of lubricant in the lubrication system upon starting up of the system, and further indicating means connected to the transducer to indicate the lack of increase in lubricant pressure.

Delay means may be interposed between the transducer for detecting the lack of increase in lubricant pressure and the indicating means, such that, in use, the indicating means indicates a lack of increase in lubricant pressure only a period of time after the start-up of the lubricating system.

The machine may further include a thermistor located in a lubricant reservoir for detecting a drop in the level of the reservoir below a predetermined level, the responsive means being responsive to a change in the resistance of the thermistor for detecting a drop in the reservoir level.

The machine may be a metal removing or metal forming machine. Alternatively the machine may be a motor vehicle.

By way of example, an embodiment of the invention will now be described with reference to the accompanying drawings, of which.

Figure 1:
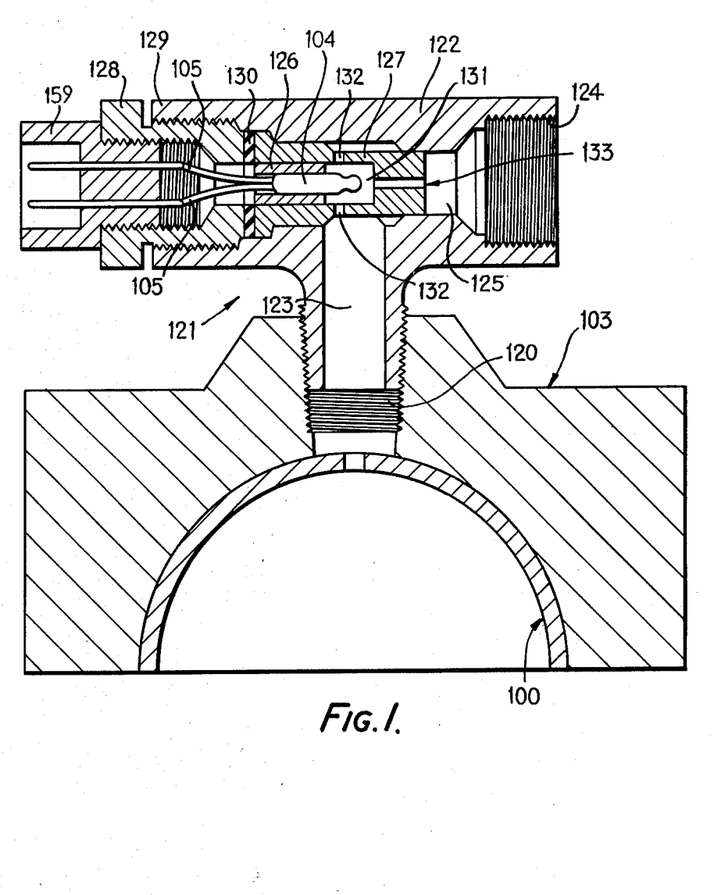
FIG. 1 is a sectional side view of a bearing assembly whose lubrication is to be monitored.

FIG. 1 shows a bearing assembly comprising a bearing housing 103 having a lubricant inlet 120 leading to a cylindrical chamber in which a bearing 100, which is not shown in detail is housed, and a transducer assembly 121 screwed into the lubricant inlet 120.

The transducer assembly 121 has a 'T' shaped hollow body 122. The central limb of the body screws into the inlet 120 and extends the lubricant inlet 120 of the bearing along a passage 123. One lateral limb of the body has a screw threaded female connection 124 into which a lubricant carrying pipe can be screwed, and a passage 125 extending from the connection 124 towards the centre of the 'T' shaped body. The other lateral limb 129 of the 'T' shaped body 122 is also hollow and has an internally screw threaded portion through which a transducer is fitted into the transducer assembly.

A transducer comprising a thermistor 104 is housed in a sleeve 126 to which it is bonded. The sleeve 126 is in turn housed in and bonded to a carrier 127. The carrier 127 is held in position in the body 122 by a locking sleeve 128 which is screwed into the limb 129 of the 'T' shaped body 122 and bears against a sealing ring 130 which in turn presses against the carrier 127. The remote end of the locking sleeve 128 receives a miniature electrical plug 159 whose terminals are connected to the connecting leads 105 of the thermistor.

A small chamber 131 is formed in the carrier 127 around the head of the thermistor 104. The chamber 131 communicates with the passage 123 via a pair of narrow passages 132 and with the passage 125 via a narrow passage 133.

In operation lubricant enters the transducer assembly 121 through the passage 125, passes through the passage 133 and into the chamber 131 where it impinges on the thermistor 104 and then passes through the passages 132 and the passage 123 into the bearing 100.

The thermistor 104 is connected to operate in the self-heated mode in which the head of the thermistor is heated by passing a current through it. The current causes heat to be dissipated from the thermistor head, causing the temperature of lubricant in the chamber 131 to rise. The input current to the thermistor is limited to some value to prevent thermal runaway of the device. The temperature of the thermistor (and therefore its resistance) depends upon the rate of dissipation of heat from the environment surrounding the thermistor and therefore depends on the thermal conductivity of the fluid around the thermistor and on the rate of flow (if any) of the fluid past the thermistor. In the present case, the thermistor responds to changes in the rate of flow of lubricant through the chamber 131.

In order to achieve maximum sensitivity of the device, the chamber 131 is small so that the heat emanating from the thermistor 104 is confined, at any moment, to a small volume of fluid. To ensure that the heat emanating from the thermistor 104 is confined substantially to the chamber 131, the passage 133 is made narrow. Since the chamber 131 is small the velocity of flow through the chamber is correspondingly high so that efficient cooling of the thermistor is achieved; this also increases the sensitivity of the thermistor to any change in the flow of lubricant. A further advantage of the provision of a small chamber 131 is that even at low fluid flow rates the lubricant in the chamber 131 changes rapidly so that the response of the thermistor to any change of flow rate is rapid.

In one particular example of the invention, using a lubricant flow rate of 0.1 cc/min the passage 133 is of 1.5 mm diameter and the chamber 131 is cylindrical having a diameter of 5.2 mm and a length of 5 mm.

The current supplied to the thermistor 104 is arranged to be sufficiently large that the temperature of the lubricant in the chamber 131 is significantly higher, during normal operation, than the ambient lubricant temperature. This greatly reduces the effect of any changes in the ambient lubricant temperature on the thermistor resistance.

Figure 2:
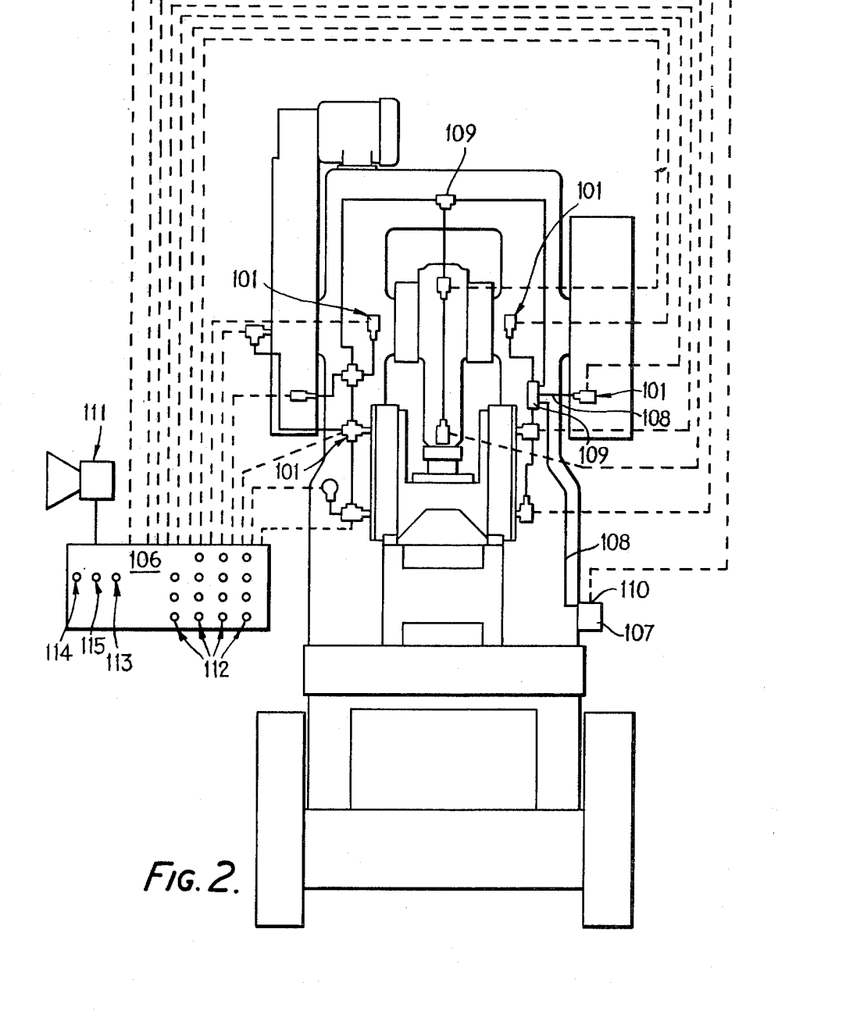
FIG. 2 is a schematic diagram of a lubrication monitoring system fitted to a mechanical press.

FIG. 2 is a schematic diagram of a lubrication monitoring system fitted to a mechanical press, the lubrication points being indicated by the reference numeral 101. Each lubricating point includes a thermistor 104 monitoring the flow of lubricant to a lubricated part as shown in FIG. 1. The thermistors 104 are all connected to a multiplexing system in a box 106 which is connected to actuate an audio alarm 111 in the event of any of the thermistors indicating a fault in the lubrication system, and which is also able to indicate by one of the light emitting diodes 112 at which lubrication point the fault has been detected. The thermistors 104 all operate to detect a change in the rate of flow of lubricant at the monitoring points.

A lubrication pump 107 is provided for circulating the lubricant through lines 108 and junctions 109. The pump includes a lubricant reservoir in which a thermistor 110 is provided. The thermistor 110 operates in the self heating mode to detect changes in level of lubricant in the reservoir, by detecting whether air or lubricant is present in the environment to the box 106 and actuates the alarm 111 while illuminating a light emitting diode 113 in the event of detection of low lubricant level. A further electrical connection (not shown) between a pressure switch in the lubrication pump outlet and the box 106 is made so that in the event of pump failure the alarm 111 sounds and a light emitting diode 114 is illuminated. A further light emitting diode 115 is provided and during operation of the system, its illumination indicates that the multiplex-monitoring system is operating.

In FIG. 2, twelve lubrication points are shown although the box 106 is shown with fifteen light emitting diodes which represents the maximum capacity of the particular multiplexing system described in this embodiment of the invention. For convenience, in the description of the multiplexing system that follows it will be assumed that the mechanical press has fifteen lubrication points rather than twelve. The multiplexing system can operate with fewer lubrication points by disconnecting the spare channel capacity.

The starting up of the monitoring system will first be described with reference to FIG. 3. On starting up of the lubricating system, a pressure switch 1 opens due to pressure being raised by the lubricating pump 107 within the lubricating system and the opening triggers a delay timer 9 via line L13. If for any reason the lubrication system fails to raise pressure, then a timer 6 is triggered, and after a pre-set time period determined by a resistor 3 and a capacitor 4 an alarm signal is produced at the output L1 of timer 6 which causes a light-emitting diode (LED) 8, corresponding to the diode 114 in FIG. 2, to be illuminated indicating a pump fault. A resistor 7 limits the current through the diode 8, and a capacitor 5 acts as a noise suppression filter between the timer power supply and ground. A resistor 2 limits the trigger current to the timers. Assuming correct lubricating pump operation, delay timer 9 times out for a pre-determined time period set by the resistor capacitor network formed by resistors 10 and 11, and a capacitor 12. This delay timer holds off the monitoring system until lubricant has commenced to flow, ensuring correct monitoring. On completion of the delay time period, a bistable flip flop 21 is operated by a signal on line L15 causing the monitoring system to be enabled by a signal on line L2 from the flip flop 21. System enabled is indicated by LED 23, corresponding to the diode 115 in FIG. 2, and a resistor 22 limits the current through the diode 23.

The remaining part of FIG. 3 which is not concerned with the starting up of the lubrication system will be described later.

Figures 3, 4:
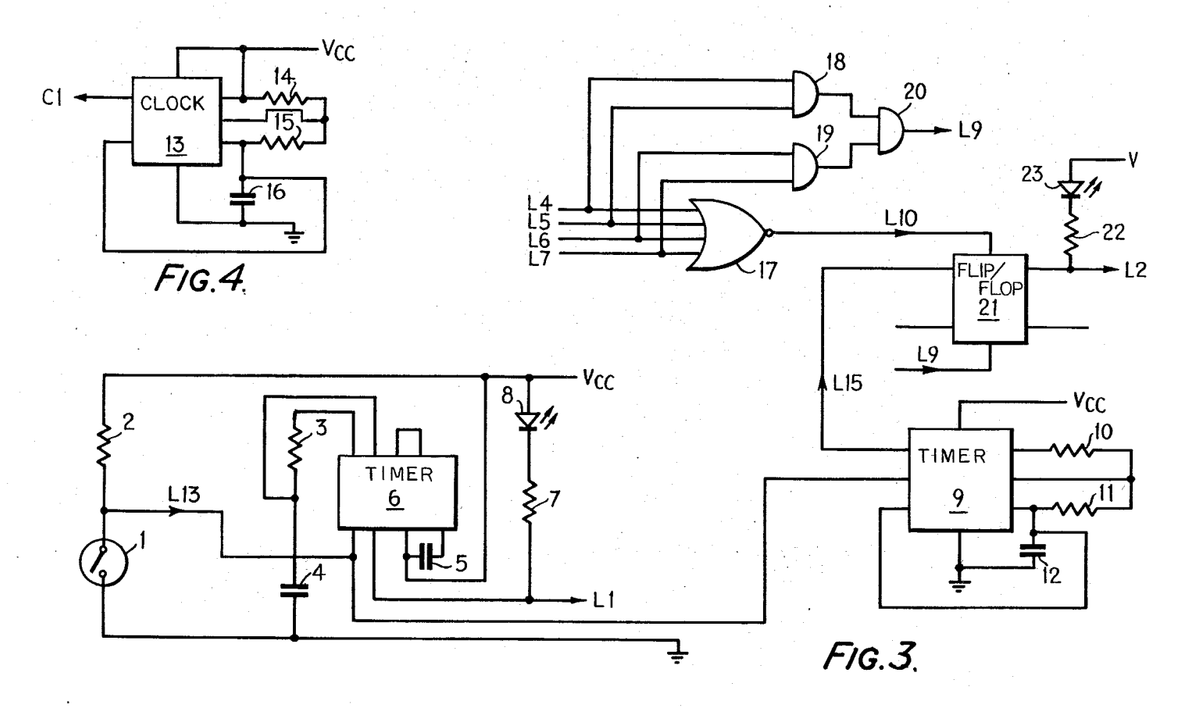
FIGS. 3 to 9 are circuit diagrams of various parts of the monitoring system.

A master clock 13 shown in FIG. 4, whose time period is set by resistors 14 and 15, and a capacitor 16, has an output C1 which is used to clock all the logic in the monitoring system.

Figure 5:
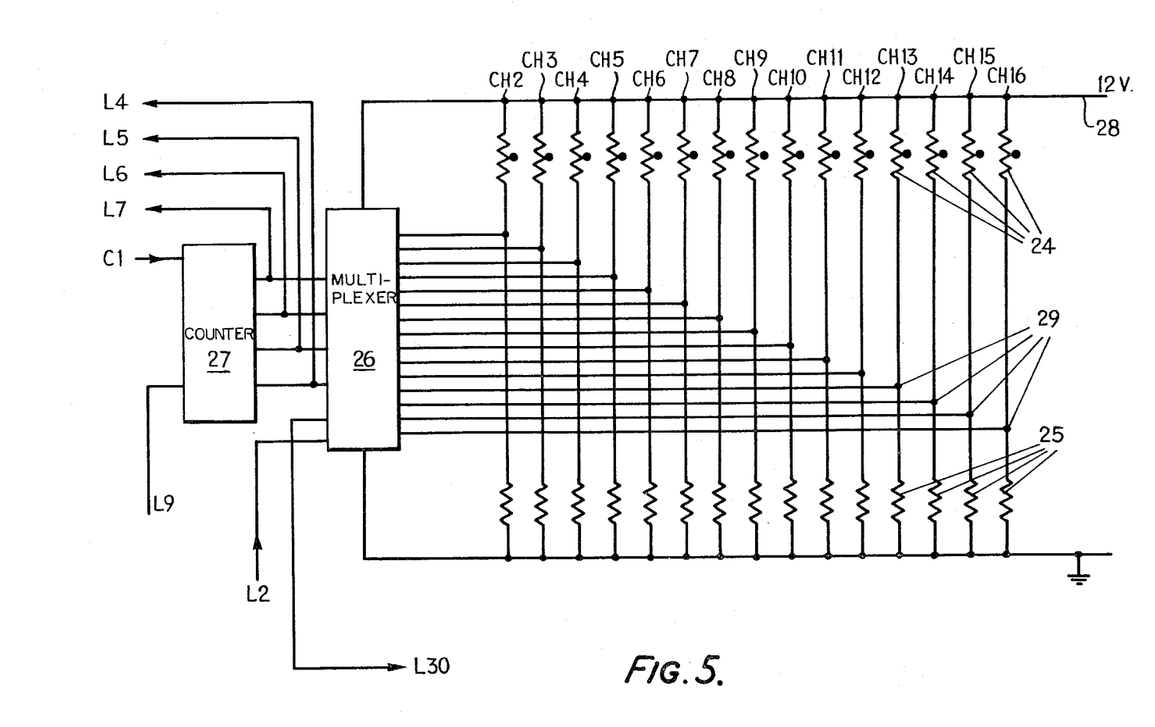
Figure 6:
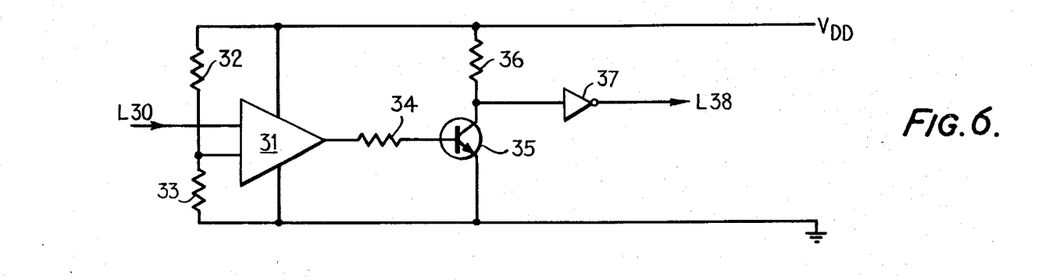

Referring to FIG. 5, channels CH2 to CH 16 are the fifteen channels for monitoring lubrication at fifteen points. At each point a thermistor 24, corresponding to one of the thermistors 104 in FIG. 1, is provided. Each thermistor 24 is connected in series with a resistor 25 forming a potential divider supplied with voltage from line 28. Thus any change of intrinsic resistance of one of the thermistors is represented as a voltage change at the junction 29 of the thermistor and the resistor. The voltage change is applied to one of the sixteen inputs of a multiplexer switch 26 which feeds the voltage in turn to a single output L30, and which is enabled by the signal on line L2. Multiplexing of the voltages is achieved via a Binary Code (B.C.) counter 27 which is controlled by the output C1 of the master clock 13. The B.C. output of the counter 27 is fed into the multiplexer switch 26, which switches each channel in turn to the common output L30. The analogue output on line L30 is fed to an analogue/digital converter shown in FIG. 6, which consists of a voltage comparator and a driver stage. The voltage comparator consists of an operational amplifier 31 with a reference voltage set by a potential divider consisting of resistors 32 and 33. The output from the voltage comparator is fed via a current limiting resistor 34 to a driver transistor 35 loaded by a resistor 36. Finally the output from the driver stage is inverted prior to transmission to the warning and audio warning line L38. The signal on this line is logic '1' in the time band corresponding to any thermistor detecting an absence of lubrication and at logic '0' for the remaining time bands.

Figure 7:
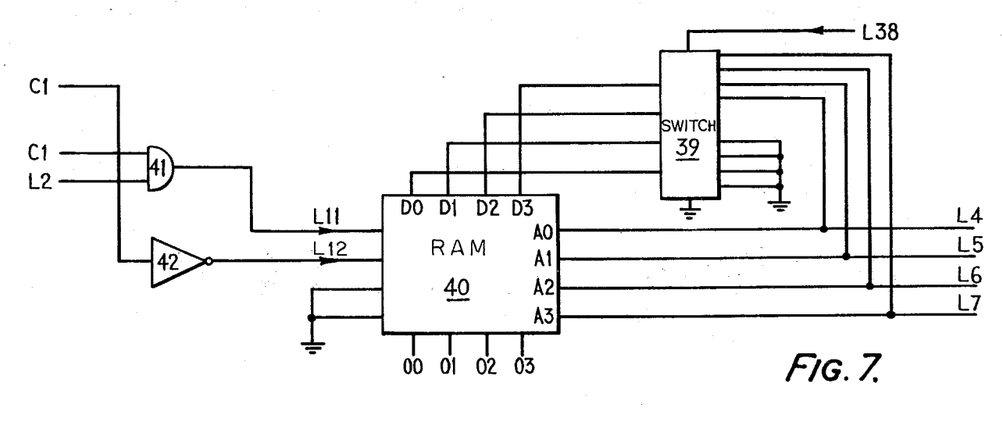

Referring to FIG. 7, the output on line L38 is fed to an eight bit to four bit switch 39. This switch 39 operates as follows: the B.C. outut from the counter 27 (FIG. 5) on lines L4, L5, L6 and L7 is fed to four of the eight bits, the other four are taken to ground, thus providing a transfer of either zeros or B.C. output to the four bits of the switch 39. The determination of which four bits of data (B.C. or zeros) is transferred to the four bit output is controlled by the signal arriving on line L38. As an example if a fault occurs, a logical one appears on line 38 causing B.C. output from the counter 27 to be transferred to the four bit output of the switch 39; with no fault occuring zeros are transferred to the four bit output of the switch 39. Thus the output from the switch 39 indicates the state of each lubrication point in turn during the scanning period, and should a fault be detected during scanning, the output of the switch 39 presents that point in B.C. while if no fault is detected the output of the switch 39 is four zeros. The B.C. from the switch 39 is then presented to the data inputs D0, D1, D2, D3 of a random access memory (RAM) 40 which is addressed at terminals A0, A1, A2, A3 by the same B.C. output lines L4, L5, L6 and L7 from the counter 27 as is the switch 39. The data is written into RAM 40 at each clock pulse, and read out of the outputs 00, 01, 02 and 03 of the RAM during the complement of the clock pulse. Thus when a fault occurs in the lubrication system, coded data referring to that point is written into the RAM 40 and a coded output of point location is read from the RAM. The RAM 40 is enabled in the write mode by an input on line L11 from the master clock 13 output on line C1 (FIG. 4) and the output of the bistable flip flop 21 on line L2, via an "AND" gate 41, and in the read mode by the clock 13 output on line C1 via inverter 42 to give the complement of the write mode on line L12. It will be seen therefore that coded data as to the state of the lubrication points is presented at the outputs of the RAM 40 in the form of a binary code.

Figures 8, 9:
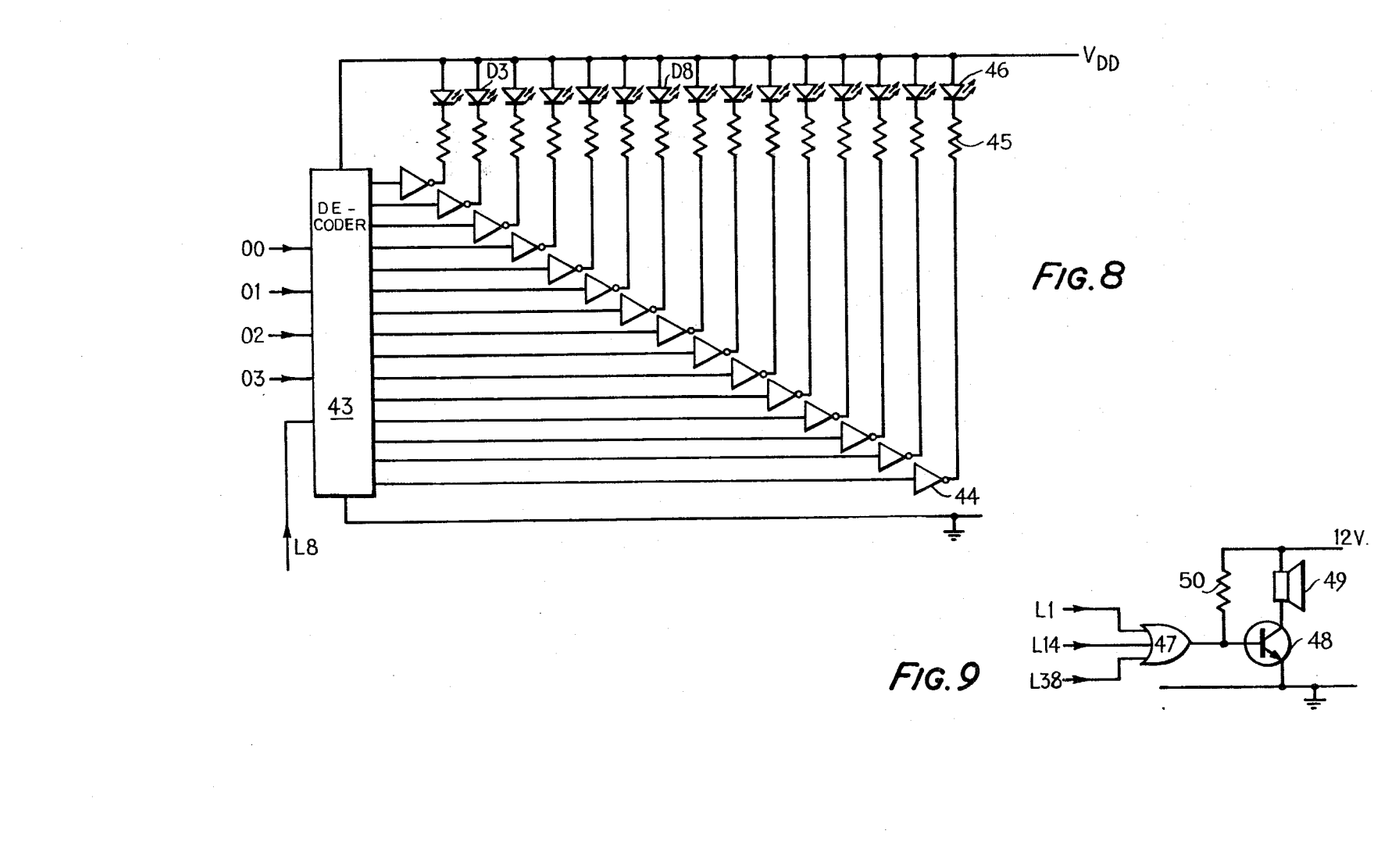

It now remains to present the coded data in the form of visual and audible indication. With reference to FIG. 8, the coded data is fed to the four bit input of the "one of sixteen decoder" 43 which is enabled at the same time as the read mode of RAM 40 (during the complement of the clock output) by a signal on line L8.

The outputs of decoder 43 are switched in turn, and each output fed via an inverter 44 and a current limiting resistor 45 to a LED 46 causing it to illuminate should a fault at that point in the system occur. The LED's 46 correspond to the LED's 112 in FIG. 2.

In addition to providing a visual indication of a fault it is useful to provide an audio warning system. Such a system is shown in FIG. 9, where the output of the timer 6 on line L1 (FIG. 3) is OR gated with the output of the analogue/digital converter on line L38 via an OR gate 47, the output of which is fed into an audio alarm buzzer driver transistor 48 thus causing buzzer 49 (corresponding to the buzzer 111 in FIG. 2) to sound. Resistor 50 limits current into the OR gate 47, and provides current for the drive transistor.

Referring again to FIG. 3, the monitoring system is reset at the end of the scanning period by feeding the output of the counter 27 on lines L4, L5, L6 and L7 to AND gates 18 and 19 whose outputs are fed to AND gate 20 whose output on line L9 is in turn fed to the flip flop 21, thus resetting the system ready for the next cycle. The flip flop 21 is set by passing the B.C. output of the counter 27 on lines L4, L5, L6 and L7 into a NOR gate 17 and taking the output from the gate on line L10 to the preset point on the bistable flip flop, thus setting the monitoring system for the next scan.

Figure 10:
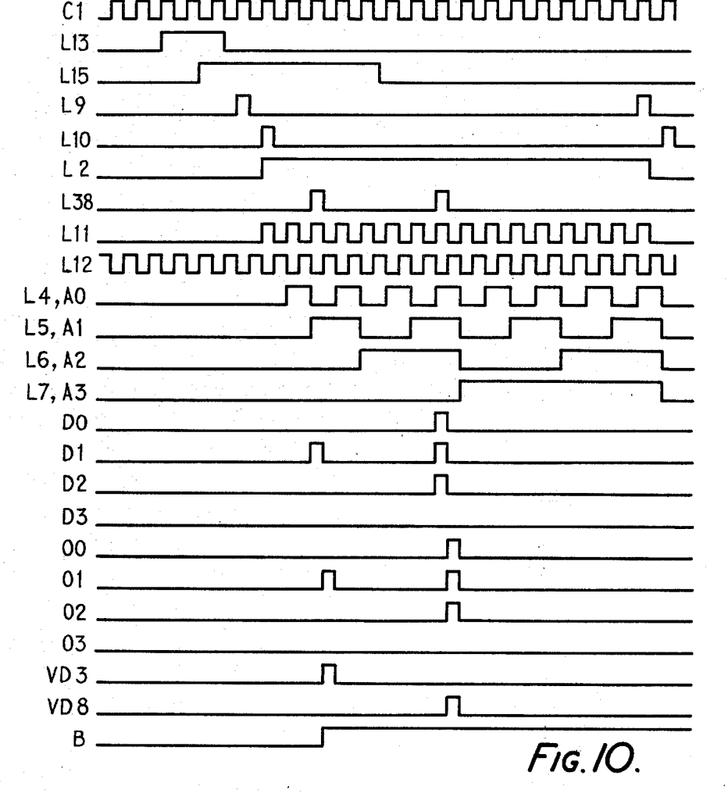
FIG. 10 is a timing diagram.

FIG. 10 shows the timing of the logic system. In the timing diagram it has been assumed that a fault has been detected at the lubrication points monitored by the thermistors in channels 3 and 8 (FIG. 5), represented by the B.C. outputs of 2 and 7 from the switch 39. As can be seen at the bottom of FIG. 10 the diodes D3 and D8 (FIG. 8) are subjected to voltages VD3 and VD8 respectively which cause the diodes to emit light for one pulse in each scan; the pulse repetition frequency, however is such that the diodes appear to be permanently on. The voltage input to the buzzer is also a pulse input but the buzzer, once triggered by a pulse, remains on as represented by the last line B of the timing diagram, until it is switched off by an operator.

Figure 11:
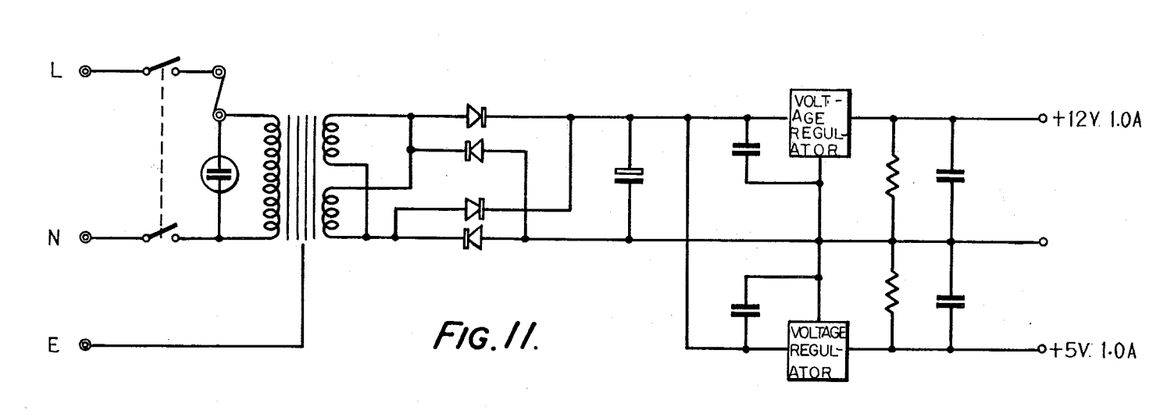
FIG. 11 is a circuit diagram of the power supply for the system.

FIG. 11 shows the power supply used to drive the electrical system, the 12 volt and 5 volt outputs of the supply constituting the voltages V, $V_{cc}$ and $V_{DD}$ shown in the Figures.

Figure 12:
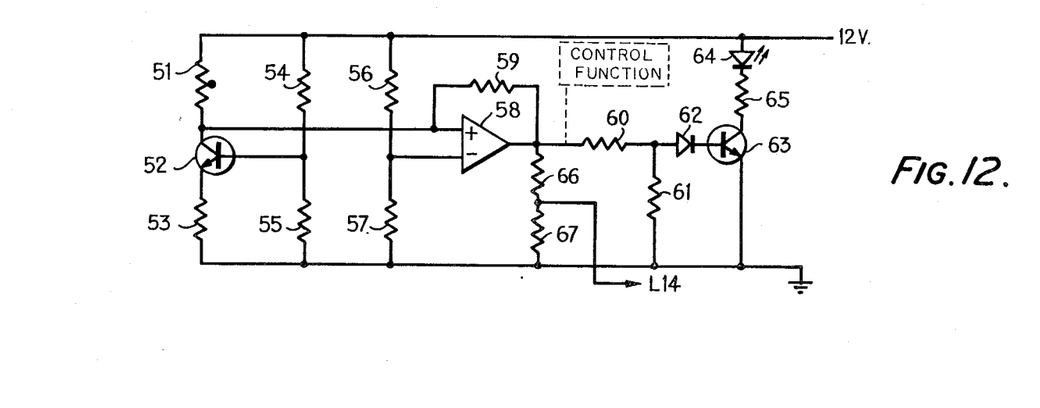
FIG. 12 is a circuit diagram of part of the monitoring system.

FIG. 12 is a circuit diagram of the part of the system monitoring the lubricant level in the oil pump reservoir. A thermistor 51 (corresponding to the thermistor 110 in FIG. 2) is mounted in the reservoir at the minimum level point to detect the presence or absence of lubricant at that point.

The thermistor 51 is supplied with constant current controlled by a transistor 52, an emitter resistor 53 and bias resistors 54 and 55. Thus when the lubricant is in contact with the thermistor 51 a voltage is present at the collector of the transistor 52. When the liquid level falls away from the thermistor 51 its intrinsic resistance reduces due to the reduction of heat transfer causing its temperature to rise. This reduction in resistance of the thermistor 51 causes the voltage at the collector of the transistor 52 to rise because constant current is being fed through the thermistor 51. The voltage at the collector of the transistor 51 is fed to a voltage comparator consisting of an operational amplifier 58 whose input threshold voltage is set by a potential divider consisting of resistors 56 and 57. A feedback resistor 59 provides hysteresis to prevent oscillation of the comparator. Thus when the voltage at the collector of transistor 52 rises above the threshold voltage of the operational amplifier 58, a positive going voltage appears at its output. The output voltage at 58 is then fed to a potential divider consisting of resistors 66 and 67, and the centre tap of the divider is taken on line L14 to an input of the OR gate 47 shown in FIG. 9. Thus when a low level condition is present in the lubricant reservoir, the audio alarm sounds. Visual indication is also given in the following way. The output from the operational amplifier 58 in FIG. 12, is also fed to bias resistors 60 and 61, and the centre tap of the resistors taken via a diode 62 to the base of a transistor 63. The emitter of the transistor 63 is taken to ground, and the collector is taken to a LED 64 (corresponding to the LED 113 in FIG. 2) via a current limiting resistor 65.

A diode 62 is connected to the base of transistor 63 to insure correct functioning of the transistor 63. Thus when the lubricant level is low in the reservoir, LED 64 is switched on at the same time as the audio alarm is operated.

The monitoring system described above provides a comparatively cheap, reliable and simple arrangement for monitoring the flow of lubricant to individual bearings in a lubrication system. The monitoring system may be arranged to give a visible and/or audible indication of any of the following faults: a lubricant pump failure; a broken lubricant feed line; a blocked metering unit, a broken tail pipe; a blocked bearing; and a low level of lubricant in a reservoir.

The use of a thermistor to monitor flow of lubricant and the presence or absence of lubricant in a lubrication system has many advantages. The small size of a thermistor enables it to be located in the flow path of the lubricant without restricting the flow of lubricant, while the robust nature of a thermistor ensures reliability of the monitoring system. Furthermore, since the output of the thermistor is a change of resistance, the thermistor is a particularly suitable transducer to use in an electrical monitoring system.

In using the thermistor in the self heating mode it is advantageous to supply the thermistor with such a current that the temperature of the thermistor is above the highest operating temperature likely to be reached by the lubricant since in this case normal operational fluctuations in the temperature of the lubricant have little effect on the resistance of the thermistor.

While one particular embodiment of the invention has been described many modifications may be made.

Figure 13:
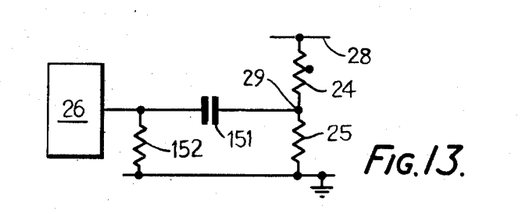
FIG. 13 is a circuit diagram illustrating a modification which may be made to the circuit of FIG. 5.

FIG. 13 illustrates a modification to the circuit arrangement of FIG. 5. Whereas in FIG. 5 the junction 29 of each thermistor 24 to its respective resistor 25 is connected directly to the multiplexer switch 26, in the modification shown in FIG. 13 each junction 29 (only one being shown in FIG. 13) is connected via a timing circuit to the multiplexer switch 26. The timing circuit comprises a capacitor 151 connected between the junction 29 and the respective input to the multiplexer switch 26 and a resistor 152 connected between the input to the multiplexer switch 26 and earth. The time constant of the timing circuit is much longer than the time taken for the thermistors 24 to respond to a lubrication fault so that a change in the resistance of a thermistor 24 due to a lubrication fault is transmitted to the multiplexer switch 26. However, gradual changes in the resistance of a thermistor 24 due to changes in ambient temperature are not transmitted to the multiplexer switch 26.

It may be desirable to monitor only the most critical lubrication points in a machine, such as, in the case of a press, the main bearings, crank bearings and slide bearings.

In the embodiment described the signal indicating a fault is used merely to provide an audible and visible indication, but it may also be used for other purposes. For instance if the system were applied to a computer programme controlled machine, the signal could be arranged to switch the programme to a safety control sub-routine. This would mean that if a lubrication fault occurred, the control of the machine would be switched to a sub-routine. The sub-routine would interupt the main programme and return the tooling to the initial point in the programme, where it would be in the unloaded condition, prior to shutting down the machine itself. Thus resulting tool damage would be avoided, reducing shut down breakages to a minimum. A further example of an application of the signal is in a cyclic machine which has to shut down only on completion of its working cycle. An example of this is a press which is usually stopped at the top of its stroke to prevent tool damage. This is usually achieved by logical switching causng repetition of the cycle at the end of each press stroke. The monitoring system could be interfaced with the press control system, such that if a fault occurred during the cycle an interlock control would be applied to prevent the press recycling. It will be seen from the foregoing that any type of safety control is possible provided that the correct interface is applied. The provision of means responsive to a fault to perform a control function is indicated by the box labelled "control function" in FIG. 12. It will be seen that the box is connected to the output of the amplifier 58.

Figure 14:
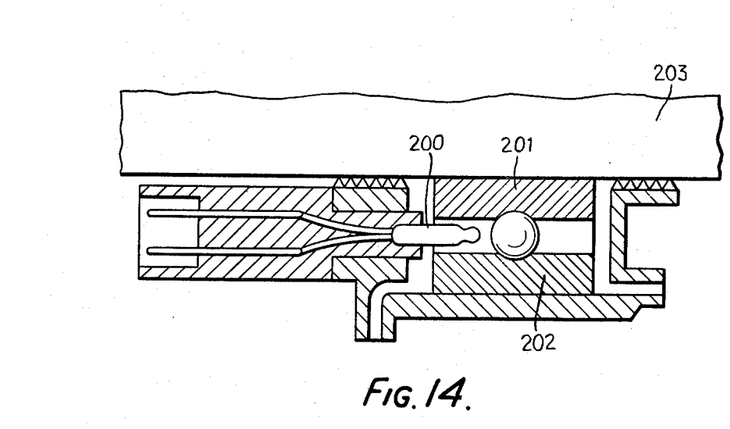
FIG. 14 is a sectional view of a bearing with a thermistor inserted between the races of bearing.

In the bearing shown in FIG. 1, the thermistor is located at the lubricant inlet to the bearing. In some circumstances it may be preferable to locate the thermistor actually in the bearing itself and the small size of the thermistor makes this possible. This has the advantage that the thermistor is responsive to the lubricant condition prevailing in the bearing itselt but has the disadvantage that the bearing probably has to be modified to receive the thermistor. The thermistor may, for example, be located between races of a bearing as shown in FIG. 14 where a thermistor 200 is shown located between an inner race 201 and an outer race 202 of a ball bearing in which a shaft 203 is journaled.

In the embodiment described, the monitoring system is provided on a mechanical press. The monitoring system may, however, by applied to any other machines having a lubrication system. For example the system may be applied to a motor vehicle.

A multiplexing system is advantageous where a considerable number of lubrication points are to be monitored but such a system is not essential, particularly if only a small number of lubrication points are to be monitored.

In the described embodiment the first channel of the multiplexer switch 26 is disconnected. This disconnected channel is represented by a B.C. output of zero from the counter 27 and cannot therefore be distinguished from the zero output of the switch 39 when no fault is detected. If the sixteenth channel is needed, however, it is possible to provide further circuit elements to enable the outputs to be distinguished.

While one particular form of multiplexing system has been described it will be appreciated that many other forms of system could be employed. In one modification to the system described with reference to the drawings, each section of the RAM 40 is, during the delay period following opening of the pressure switch 1, loaded with signals corresponding to a fault being detected at each point of the system. On completion of the delay time, the system begins to scan and at each point scanned, provided the point is properly lubricated, the fault signal written into the RAM 40 is cancelled; if the point is not properly lubricated the fault signal written into the RAM 40 is not cancelled. The scanning of all the points continues cyclically until the pressure switch 1 closes, which, in this modification, occurs after several scan cycles the last of which may not be complete. Upon closure of the pressure switch 1, the RAM 40 is read and any faults indicated by the appropriate LED. The period for which the pressure switch 1 is open is a function of the viscosity of the lubricant so that with more viscous lubricants the lubrication points are scanned for a longer time thereby ensuring that the lubricant has an opportunity to reach each lubrication point. Thus the system provides automatic compensation for any changes in lubricant viscosity. Also since the lubrication points are scanned for the whole time that the monitoring system is enabled there is little chance of any electrical noise being transmitted through the system and giving a false indication.

In the illustrated embodiment of the invention a respective LED is provided for each point that is monitored. Al alternative arrangement is to provide a seven segment LED display which is arranged, in the event of a lubrication fault being detected, to flash the number (or numbers) of the lubrication point at which the fault has been detected. According to the number of lubrication points being monitored one or two seven segment LED display units may be provided.

What is claimed is:

1. A bearing assembly including:
    a lubricated bearing,
    an assembly interposed in the lubricant flow path at or adjacent the bearing, the assembly comprising a housing defining a chamber, first passage means extending from the chamber to a first port for connection to a lubricant supply and second passage means extending from the chamber to a second port connected to the lubricant flow path through the bearing, the first passage means being so narrow that lubricant in the chamber is substantially thermally isolated from the lubricant upstream of the chamber, and
    a thermistor located in the chamber,
    wherein the thermistor is connected in an electrical circuit in the self-heating mode to respond to a deleterious change in the flow of lubricant along the path.

2. A bearing assembly as claimed in claim 1 in which the chamber is small.

3. A machine having a lubricated part and including a bearing assembly as claimed in claim 2.

4. A machine as claimed in claim 3, further including a lubrication system and a lubrication monitoring system for monitoring lubrication at a plurality of points in the machine, one of the points being said bearing assembly, the monitoring system including a plurality of thermistors for location at respective ones of said plurality of points in the machine to respond to a deleterious change in the lubricant flow at the monitored point by a change in the resistance of the thermistor at that point, and the system further including means responsive to a change in resistance of a thermistor to perform a desired function.

5. A machine as claimed in claim 4 further including multiplexing means for scanning each of the electrical outputs from the thermistors in turn, the responsive means being connected to an output of the multiplexing means to respond to a change in the electrical output of any of the thermistors.

6. A machine as claimed in claim 4 in which the responsive means includes indicating means to perform an indicating function in response to a change in resistance of a thermistor.

7. A machine as claimed in claim 6 in which the indicating means includes a light emitting diode display.

8. A machine as claimed in claim 6, in which a respective indicating means is provided for each of the thermistors and each indicating means comprises a light emitting diode.

9. A machine as claimed in claim 6 in which a common indicating means is provided to give a fault indication in the event of a deleterious change in the lubricant condition at any of the monitored points.

10. A machine as claimed in claim 9 in which the common indicating means is an audio alarm.

11. A machine as claimed in claim 4 in which the responsive means includes control means for performing a control function in response to a change in resistance of a thermistor.

12. A machine as claimed in claim 4 further including a transducer for detecting a lack of increase in the pressure of lubricant in the lubrication system upon starting up of the system, and further indicating means connected to the transducer to indicate the lack of increase in lubricant pressure.

13. A machine as claimed in claim 12 in which delay means are interposed between the transducer for detecting the lack of increase in lubricant pressure and the indicating means, such that, in use, the indicating means indicates a lack of increase in lubricant pressure only a period of time after the start-up of the lubricating system.

14. A machine as claimed in claim 4 further including a thermistor located in a lubricant reservoir for detecting a drop in the level of the reservoir below a predetermined level, the responsive means being responsive to a change in the resistance of the thermistor for detecting a drop in the reservoir level.

15. A machine as claimed in claim 3 in which the machine is a metal removing machine.

16. A machine as claimed in claim 3 in which the machine is a motor vehicle.

17. A machine as claimed in claim 3 which the machine is a metal forming machine.

18. A bearing assembly including:
a lubricated bearing,
a housing defining a small chamber interposed in the lubricant flow path through, to or from the bearing, first passage means extending from the small chamber to a first lubricant inlet port and second passage means extending from the small chamber to a second lubricant outlet port connected to the lubricant flow path through the bearing, the first passage means being so narrow that lubricant in the small chamber is substantially thermally isolated from the lubricant upstream of the small chamber, and
a thermistor in heat exchange relationship with lubricant in the small chamber,
wherein the thermistor is connected in an electrical circuit in the self-heating mode to respond to a deleterious change in the flow of lubricant along the path.

19. A bearing assembly as claimed in claim 18 in which the thermistor is located between races of the bearing.

* * * * *

UNITED STATES PATENT AND TRADEMARK OFFICE
CERTIFICATE OF CORRECTION

PATENT NO. : 4,354,183
DATED : October 12, 1982
INVENTOR(S) : MICHAEL W. WEEKS ET AL It is certified that error appears in the above—identified patent and that said Letters Patent is hereby corrected as shown below:

Column 6, line 24, "outut" should be --output--;

Column 9, line 37, "itselt" should be --itself--;
Column 9, line 46, "by" should be --be--;
Column 10, line 25, "Al" should be --An--;
Column 10, line 54, "claim 2" should be --claim 1--; and
Column 12, line 13, "after claim 3" insert --in--.

Signed and Sealed this

First Day of February 1983

[SEAL]

Attest:

GERALD J. MOSSINGHOFF

Attesting Officer     Commissioner of Patents and Trademarks